United States Patent [19]
Siewert

[11] B 3,924,576
[45] Dec. 9, 1975

[54] STAGED COMBUSTION ENGINES AND METHODS OF OPERATION

[75] Inventor: Robert M. Siewert, Birmingham, Mich.

[73] Assignee: General Motors Corporation, Detroit, Mich.

[22] Filed: Aug. 21, 1972

[21] Appl. No.: 282,390

[44] Published under the Trial Voluntary Protest Program on January 28, 1975 as document no. B 282,390.

Related U.S. Application Data
[63] Continuation-in-part of Ser. No. 252,853, May 12, 1972.

[52] U.S. Cl.................. 123/1 R; 123/59 EE; 60/15
[51] Int. Cl.²................... F02B 75/10; F02B 75/12
[58] Field of Search............. 123/59 EC, 1 R; 60/15

[56] References Cited
UNITED STATES PATENTS

| | | | |
|---|---|---|---|
| 2,113,601 | 4/1938 | Pratt | 123/1 |
| 2,113,602 | 4/1938 | Pratt | 123/1 |
| 2,132,646 | 10/1938 | Rieppel et al. | 123/1 |
| 2,249,997 | 7/1941 | Wydler | 123/1 |
| 2,645,216 | 7/1953 | Campbell | 60/15 |
| 3,142,289 | 7/1964 | Platner et al. | 123/55 VE |
| 3,400,692 | 9/1968 | Jones | 123/8.07 |
| 3,513,929 | 5/1970 | Kim | 123/1 |

Primary Examiner—Wendell E. Burns
Assistant Examiner—W. Rutledge, Jr.
Attorney, Agent, or Firm—Robert J. Outland

[57] ABSTRACT

Expansible chamber engine arrangements and operating methods for staged combustion to obtain low emissions of unburned hydrocarbons, carbon monoxide and nitrogen oxides. In a preferred form described in the specification, the engine is a multi-cylinder four-stroke cycle reciprocating engine, such as a V-8 engine, having about 8 to 1 compression ratio. Two cylinders of each bank serve as first stage combustion chambers, and discharge into an interstage manifold for that bank. The two separate interstage manifolds communicate, respectively, with the intakes of the two other cylinders of the same bank, which serve as second stage combustion chambers. Also, in accordance with a preferred form of the invention, fuel-rich mixtures of about 10 to 1 air-fuel ratio are burned in the first stage cylinders yielding partially burned combustion products and non-combustibles with minimum nitrogen oxides. Air is added to these interstage exhaust gases to provide dilute mixtures with a slightly lean overall air-fuel ratio of about 15 to 1. These mixtures are burned to substantial completion in the second stage cylinders to produce engine exhaust gases containing very small amounts of unburned hydrocarbons, carbon monoxide and nitrogen oxides. Further, in a preferred form of the invention, both first and second stage cylinders operate on the four-stroke cycle and both contribute substantially to the net mechanical energy developed by the engine. The rich air-fuel mixtures supplied the first stage cylinders are preferably spark-ignited in conventional manner while the slightly lean and highly diluted mixtures supplied the second stage cylinders are compression ignited, selection of the content and temperature of the second stage mixtures, compression pressures and other parameters providing ignition near the end of the compression stroke.

6 Claims, 13 Drawing Figures

STAGED COMBUSTION ENGINES AND METHODS OF OPERATION

CROSS-REFERENCE TO RELATED APPLICATION

This application is a continuation-in-part of my application of the same title filed May 12, 1972, Ser. No. 252,853 assigned to the same assignee as the present application.

DESCRIPTION OF THE INVENTION

The present invention provides an improved engine arrangement and methods of engine operation characterized by two-stage combustion in expansible chambers that expand and contract in synchronism and each supplies net energy per cycle, preferably to a common rotating shaft. The first stage is preferably spark ignited and the second stage is compression ignited. Fuel-rich combustion occurs in the first stage with minimal nitrogen oxide production. Slightly fuel-lean combustion occurs in the second stage with resultant minimizing of hydrocarbon and carbon monoxide emissions. Also, the presence of partially burned products in the second stage mixture limits combustion temperatures so that nitrogen oxides are not significantly increased in this stage.

The method of the present invention includes the steps of:

1. Burning in one chamber of an expansible chamber reciprocating or rotary internal combustion engine a compressed combustible mixture including air and hydrocarbon fuel, said burning comprising a first stage of combustion and said mixture being richer in fuel than a stoichiometric mixture by amount sufficient to yield combustion products low in oxides of nitrogen ($NO_x$) but high in incompletely burned combustibles, largely hydrogen ($H_2$) and carbon monoxide ($CO$). The air-fuel ratio in this stage is preferably about 10 to 1. In this first stage, the chamber is preferably operated on the known four-stroke cycle with spark ignition of the compressed mixture;

2. Expanding the resulting combustion products to supply power to the usual crank-shaft of a reciprocating or rotary engine apparatus;

3. Conditioning the expanded combustion products of the first stage at least by the addition of air, so as to prepare a new mixture capable of further power-producing combustion. This mixture is characterized by substantially less energy content than the charge in the first chamber, since the hydrocarbon fuel has been partially burned. In accordance with a preferred form of the present invention, the amount of air in the newly formed mixture is such as to provide about a 15 to 1 overall engine air-fuel ratio, or only slightly in excess of the stoichiometric quantity of air required for complete combustion of the fuel;

4. Recompressing the new mixture in an expansible chamber of the reciprocating or rotating internal combustion engine sufficiently to initiate second stage combustion by auto-ignition, and burning the mixture without substantial additional compression. The point of ignition of the mixture may be maintained near the end of the compression step by appropriate choice of the compression ratio of the second stage chamber, heating or cooling the mixture between the stages or by the addition of other substances thereto as a part of the conditioning step before second stage compression. In accordance with a preferred form of the present invention, the expansible chamber of the second stage passes through a four-stroke cycle and its piston or rotor is connected by suitable crank mechanism to the same crankshaft as the piston or rotor of the first stage chamber;

5. Expanding the products of the second stage combustion with a resultant output of power to the crankshaft.

The air-fuel mixture ratio in the first stage is selected to minimize overall emissions of nitrogen oxides. If the mixture is not sufficiently rich, unnecessarily high amounts of nitrogen oxides will be produced in the first combustion stage. If, however, the mixture is too rich, there will be insufficient burned gases resulting from the first stage combustion to adequately dilute the charge in the second stage. Tests have indicated that, for the preferred operational method described, oxides of nitrogen emissions are minimized by selection of a first stage air-fuel ratio of about ten and one-half to one (10.5:1). Various other ratios may, however, be preferable under varying conditions of operation, including, for example, use of different mixture constituents or variations in the operating method.

Variations of the method may include the use of exhaust gas recirculation, from either between the stages or from the final exhaust, to the inlet of the first stage for mixture with the initial charge to yield even lower emissions of nitrogen oxides.

The interstage conditioning step involves adding air to the first stage combustion products. It may also involve adding exhaust products or other diluents to the mixture, heating or cooling of the mixture, adding combustion stimulants or retardants, or other changes to provide the proper conditions for subsequent compression and burning with the desired efficiency. Control of the mixture temperature between stages should be such as to promote initiation of second stage combustion by auto-ignition at the most favorable point in the cycle (shortly before the end of compression and beginning of expansion) and to prevent substantial oxidation of the combustibles before this point. Tests have shown that there is an optimum range of interstage temperature for a specific engine and operation condition, as discussed hereafter.

Control of the timing of second stage burning may be aided by varying or controlling the compression ratio or the compression pressure reached during the compression stroke of the second stage portion of the cycle.

The method of the present invention may be carried out in engines of a number of different forms in which power is obtained from the burning of combustibles within an expansible combustion chamber. Included, for example, are reciprocating piston engines and rotary piston engines, each of which utilizes variable volume working and combustion chambers, together with suitable crankshaft mechanism.

The presently preferred arrangement for utilizing the method in an engine involves the use of two working chambers or sets of working chambers connected in series with the first stage combustion taking place in one chamber and the second stage combustion in the other. Preferably, both chambers will be operated on the conventional four-stroke cycle or its equivalent. However, operation of one or both chambers on a two-stroke cycle is also possible. Additionally, it is within the scope of the invention to perform both combustion stages sequentially in the same combustion chamber which might, for example, be operated on a six-stroke cycle. In multi-cylinder or multi-chamber engine arrangements, it is possible to arrange for the first stage combustion chambers to feed one or more interstage manifolds, which in turn distribute the products to the second stage combustion chambers after undergoing the appropriate conditioning treatment.

There is provided a first stage of fuel-rich combustion, and work-producing expansion, yielding low residuals of nitrogen oxides but with little control of combustibles. This is followed by a second stage of combustion and work-producing expansion, before which the mixture is conditioned to aid proper timing of its ignition and provide substantial elimination of combustibles in the combustion step without significantly increasing nitrogen oxides. The overall result is an engine and method producing low emissions of combustibles and nitrogen oxides in the exhaust with the added benefit of relatively good efficiency due to the production of substantial work from both combustion stages.

These and other advantages of the invention, as well as various additional modifications of the operating methods and structures for performing such methods, will be more completely understood from the following description of certain preferred embodiments, taken together with the accompanying drawings.

DESCRIPTION OF ILLUSTRATIVE EMBODIMENTS

Figure 1:
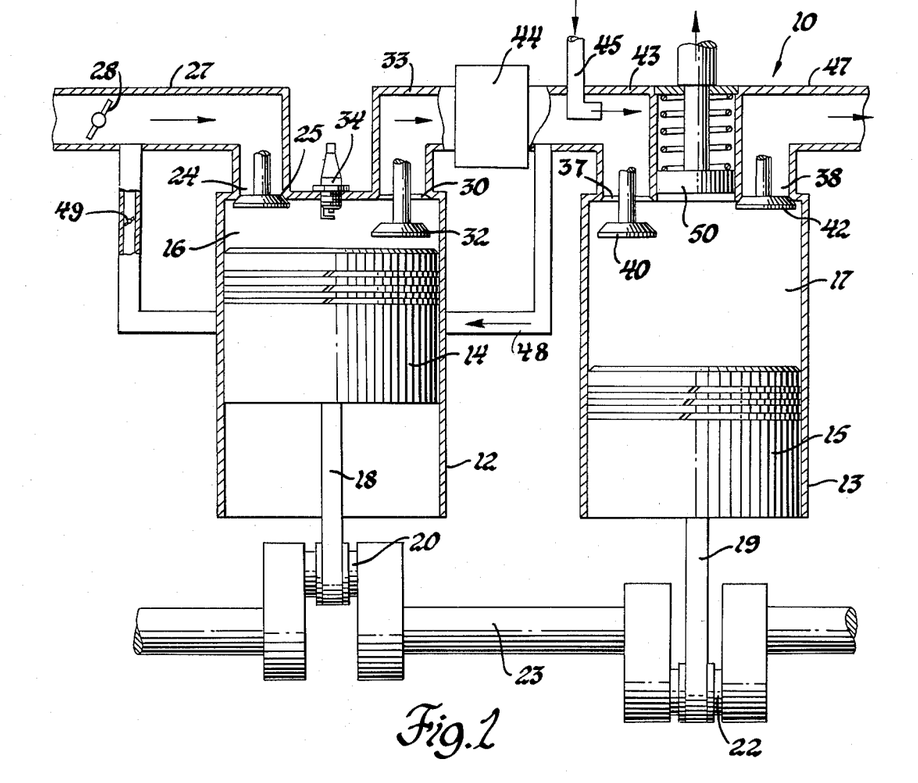
FIG. 1 is a diagrammatic representation of a preferred form of reciprocating piston type internal combustion engine formed according to the invention.

Referring first to FIG. 1 of the drawings, numeral 10 generally indicates a two-cylinder internal combustion engine having a pair of cylinders 12, 13 containing reciprocating pistons 14, 15, respectively, and defining therewith variable volume working and combustion chambers 16, 17, respectively. Pistons 14, 15 are respectively connected by connecting rods 18, 19 to the oppositely eccentric throws 20, 22 of a crankshaft 23.

Cylinder 12 includes an inlet port 24 controlled by a poppet valve 25 and connecting with a source of air and fuel mixture, such as a carburetor or fuel injection means, not shown, through an inlet conduit 27 having a throttle 28. Cylinder 12 also includes an exhaust or outlet port 30 controlled by a poppet valve 32 and connecting with an outlet conduit 33. A spark plug 34 is also provided in the cylinder 12 to ignite combustible fuel mixtures in the combustion chamber 16.

Cylinder 13 includes inlet and exhaust ports 37, 38 controlled respectively by an inlet poppet valve 40 and an exhaust poppet valve 42. Inlet port 37 connects through an inlet conduit 43 and outlet conduit 33 with the combustion chamber 16 of cylinder 14. A heat exchanger 44 and an air admission pipe 45 are provided in the inlet conduit 43 for purposes to be subsequently described. The exhaust port 38 of cylinder 12 connects with an exhaust conduit 47. An exhaust recirculation conduit 48 connects inlet conduit 27 directly with the second stage inlet conduit 43. A valve 49 is provided for controlling the amount of flow permitted through the recirculation conduit. If desired, the recirculation conduit could be connected with the second stage exhaust conduit 47, rather than the interstage inlet conduit 43. A movable piston 50 is provided in the end wall of cylinder 13 so as to provide for varying the compression ratio of the cylinder during operation.

In operation, power delivered to the pistons causes rotation of the cranksaht 23, timing the movements of the pistons 13, 14 within their respective cylinders in an out-of-phase reciprocating motion. Each piston-cylinder combination follows a four-stroke operating cycle, including the usual events of intake, compression, expansion and exhaust, the exhaust stroke of piston 14 coinciding with the intake stroke of piston 15. Thus, piston 15 is timed 540° after piston 14 as regards their operations on a particular inlet charge to cylinder 12, which is subsequently transferred to cylinder 13.

The overall engine cycle is as follows. Downward movement of the piston 14 on its intake stroke draws a mixture of fuel and air in predetermined proportions into the first stage cylinder 12, where it is compressed on the upward compression stroke and ignited by the spark plug 34 to initiate the first stage of combustion. Preferably, a very rich fuel mixture is supplied (e.g.; about 10 to 1 air-fuel ratio) so that upon burning, the combustion temperatures will be limited and formation of nitrogen oxides will be maintained at a minimum, leaving, however, substantial amounts of combustibles, primarily carbon monoxide (CO) and hydrogen ($H_2$), in the combustion products. During and following combustion, the combustion products are expanded on the downward expansion stroke of the piston 14, giving a resultant output of power to the crankshaft 23.

The expanded first stage combustion products are exhausted from cylinder 12 on the upward exhaust stroke of piston 14, passing through the heat exchanger 44 and intake conduit 43 to the second stage cylinder 13 into which they are transferred by piston 15 moving downwardly on its intake stroke while piston 14 is moving upwardly on its exhaust stroke. Air supplied through pipe 45 mixes with the first stage combustion products during the interstage transfer step, thus supplying the second stage cylinder with a mixture of combustibles and air, preferably of approximately stoichiometric ratio or slightly lean in fuel (e.g.; about 15 to 1 overall air-fuel ratio and, in either case, heavily diluted with unburnables and having limited heat content in the combustibles because of prior partial combustion.

The second stage mixture is then compressed on the upward compression stroke of piston 15 and is ignited by autoignition at a point preferably near the end of the compression stroke. Burning then takes place in which the combustibles are almost completely burned but the combustion temperatures are relatively low so that little or no additional oxides of nitrogen are formed. The downward expansion stroke of piston 15 follows, giving an output of additional work to the crankshaft 23 and the resulting combustion products are then exhausted through conduit 47 on the upward exhaust stroke of the piston 15. If desired, a portion of the first stage exhaust gases may be recirculated to the first stage inlet through the recirculation conduit 48.

Figure 2:
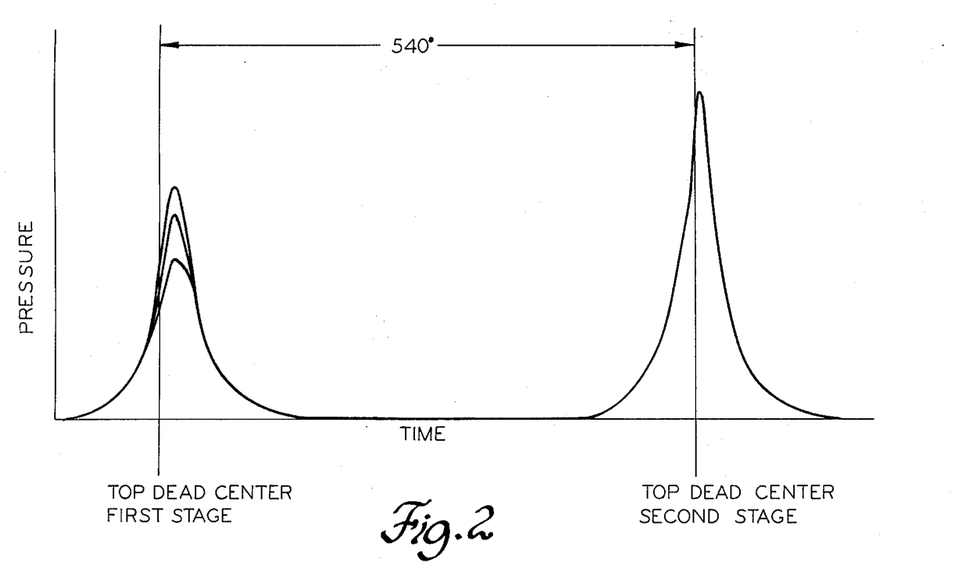
FIG. 2 is a graph of pressure versus time illustrating cylinder pressures developed under staged combustion conditions in an operating engine.

FIG. 2 illustrates graphically an exemplary record of the pressure versus time events in an engine operating under staged combustion conditions as heretofore described.

In tests of the method of the present invention, an engine having two operating cylinders, each with a displacement of 50 cubic inches, was arranged to have the cylinders connected and the pistons timed in the manner of FIG. 1. The transfer pipe between the cylinders was insulated to limit heat loss. The engine was operated at 1,200 rpm on gasoline. Both cylinders had compression ratios of 8.27 to 1. The results of two test runs on the engine are shown in Table A for comparison. Relative cylinder pressures versus time occurring during the second (staged combustion) run are illustrated by the graph of FIG. 2.

Table A

| Condition | Run 1 | Run 2 |
| --- | --- | --- |
| Staged combustion | No | Yes |
| First stage air-fuel ratio | 10.3:1 | 10.3:1 |
| Second stage air-fuel ratio | 10.3:1 | 14.9:1 |
| Interstage air added-percent of first stage air | 0 | 45 |
| Indicated power-HP | 5.7 | 8.2 |
| Indicated fuel consumption-lbs/ihp-hr | .545 | .380 |
| Intake vacuum-in. Hg. | 11.3 | 10.8 |
| Transfer pressure-in. Hg. | −1.7 | +5.4 |
| Temperature out first stage-°F. | 1,015 | 1,035 |
| Temperature in second stage-°F. | 995 | 924 |
| Temperature out second stage-°F. | 335 | 750 |
| Exhaust emissions | | |
| Nitrogen oxides-parts per million* | 125 | 128 |
| Hydrocarbons-parts per million* | 227 | 12.3 |
| Carbon monoxide-percent* | 8.6 | .29 |

*corrected to stoichiometric air-fuel ratio-by multiplying measured concentration by ratio of actual air-fuel ratio to stoichiometric air-fuel ratio.

As the table indicates, both runs were made with an air-fuel mixture ratio of 10.3 to 1 supplied to the first stage combustion chamber. In the first run, the combustion products from the first stage were supplied directly to the second stage without any change in composition. In the second run, however, secondary air was continuously supplied to the transfer pipe in an amount equal to 45 percent of the air in the initial charge, giving a slightly lean air-fuel ratio** of 14.9 to 1 in the second stage cylinder. As a result, corrected exhaust emissions of nitrogen oxides ($NO_x$) increased only slightly from 125 parts per million (ppm) in the first run to 128 ppm in the second run. At the same time, hydrocarbon (HC) emissions dropped significantly from 227 ppm to only 12.3 ppm and carbon monoxide (CO) emissions were reduced from 8.6% to only 0.29% of the exhaust products. Also, as a result of the added secondary air, indicated power from the engine increased from 5.7 to 8.2 horsepower, showing a significant work output from the second combustion stage, and indicated fuel consumption was reduced from 0.545 pounds per indicated horsepower-hour to 0.380 pounds per indicated horsepower-hour. From these figures, it is apparent that with proper control, the staged combustion process results in significant exhaust emission advantages while yielding good engine operating efficiencies.

**The test runs were made with a gasoline fuel for which the stoichiometric air-fuel ratio is about 14.5 to 1.

Figure 3:
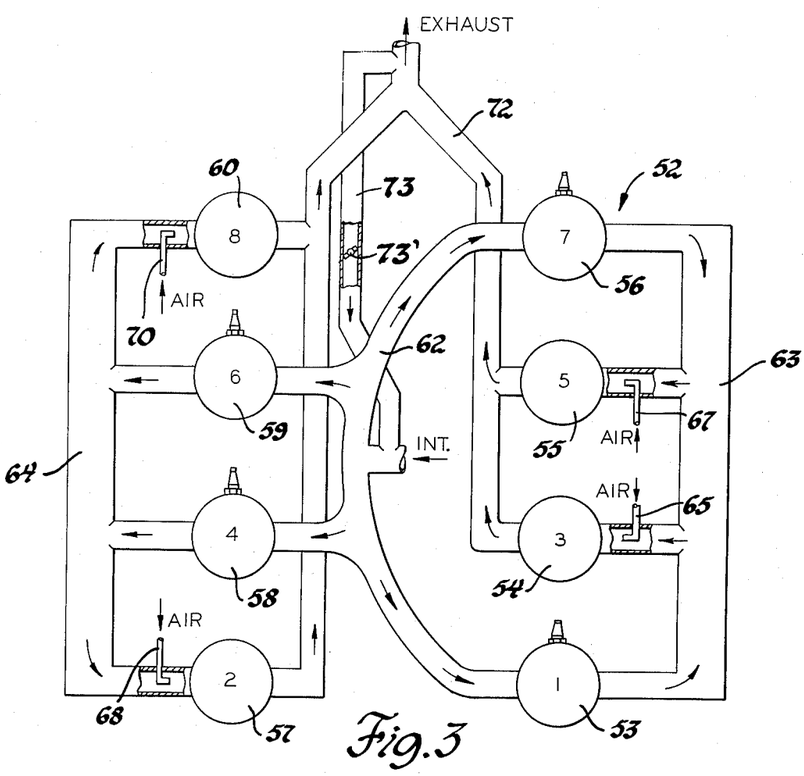
FIG. 3 is a diagrammatic view of a multi-cylinder reciprocating piston internal combustion engine showing a preferred form of arrangement according to the invention.

Referring now to FIG. 3, there is shown an alternative arrangement for a multi-cylinder reciprocating piston engine generally indicated by numeral 52 and arranged to operate partially in the manner of the engine of FIG. 1. Engine 52 includes eight cylinders 53 – 60 arranged in two banks of four cylinders each of the manner of a conventional V-8 engine. However, in engine 52 only cylinders 53, 56, 58 and 59 connect with an intake manifold 62 through which they are supplied with an air-fuel mixture for first stage combustion therein. Cylinders 53 and 56 connect with a common interstage manifold 63 to which their exhaust products are supplied, while cylinders 58 and 59 likewise connect with a common interstage manifold 64 to which they supply exhaust products. Manifold 63 connects with cylinders 54 and 55, supplying them with exhaust products from cylinders 53 and 56 for second stage combustion, air being added to the mixture through air supply pipes 65, 67 provided in the inlets of cylinders 54 and 55, respectively. In like manner, manifold 64 is connected with cylinders 57 and 60 and supplies them with combustion products from cylinders 58 and 59 for second stage combustion, air being added through air supply pipes 68, 70 connecting with the inlets of cylinders 57 and 60, respectively. Cylinders 54, 55, 57 and 60 all exhaust their second stage exhaust products to a common exhaust system 72. An exhaust recirculation line 73 is provided for connecting the common exhaust system 72 with the intake manifold 62. A recirculation control valve 73' is provided to control flow through the line 73.

In operation, first stage combustion of the mixture supplied to the engine takes place in cylinders 53, 56, 58 and 59 with second stage combustion occurring in cylinders 54, 55, 57 and 60. The timing of the various cylinders is preferably equally spaced with alternative firing of the first and second stage cylinders to give relatively even power impulses to the engine crankshaft. The interstage manifolds 63, 64 are of sufficient volume to handle the exhaust discharge of the respective cylinders without undue pressure variations. If desired, the interstage manifolds could be joined to reduce pressure variations due to variations in timing, though this should not be necessary if manifolds of sufficient volume are provided. Alternatively, differing cylinder connections or crank arrangements could be chosen to equalize, neutralize or reduce pulsing in the interstage manifolds so as to equalize cylinder gas charges in the engine.

Figure 4:
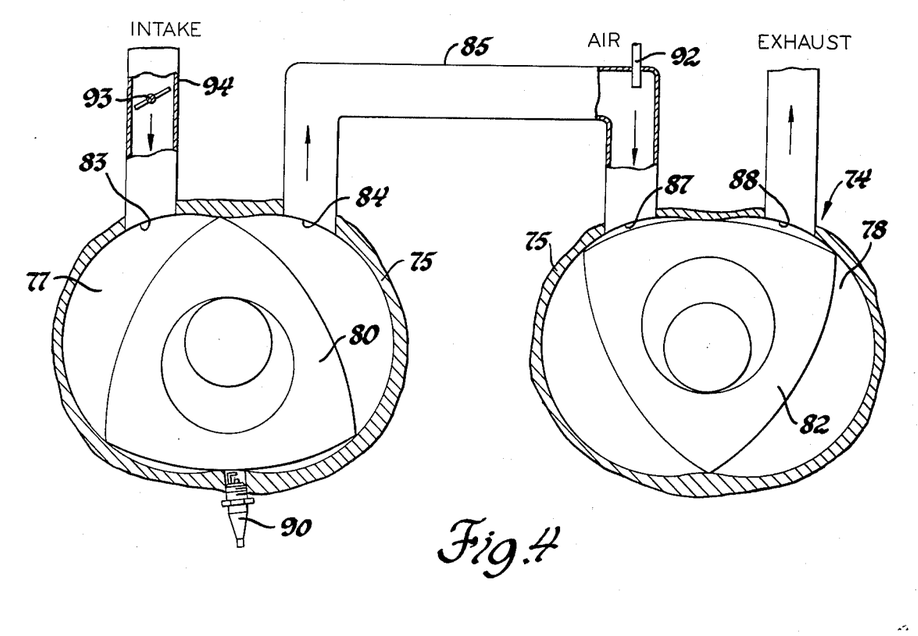
FIG. 4 is a diagrammatic view of a dual rotor rotary piston engine arranged to perform the method of the invention.

Referring now to FIG. 4 of the drawings, there is disclosed a two-rotor rotary engine generally indicated by numeral 74 and arranged to perform the method according to the invention. Engine 74 includes a housing 75 defining a pair of two-lobed trochoidal rotor cavities 77 and 78 in which three-sided rotors 80 and 82 are respectively eccentrically rotatable, each rotor defining with the housing a plurality of variable volume combustion chambers which move about upon rotation of the rotor in known fashion.

Cavity 77 is provided with an intake port 83 and an exhaust port 84, the latter being connected through a conduit 85 with the inlet port 87 of cavity 78. An exhaust port 88 is also provided for cavity 78. The engine further includes spark ignition means, such as spark plug 90, connecting with the housing and opening to the cavity 77, an air supply pipe 92 connecting with the conduit 85 and throttle means 93 formed in the inlet conduit 94 connecting with the inlet port 83. If desired, an interstage heat exchanger could also be provided as could means for varying the second stage compression ratio.

In operation, rotation of the engine rotors causes a fuel-rich air-fuel mixture to be drawn into the cavity 77, where it is compressed, burned in a first stage of combustion, and expanded with power output to the rotor 80. The combustion products are then transferred through conduit 85 to the second stage cavity 78, additional air being added through pipe 92 during the transfer process. In cavity 78 the first stage combustion products are again compressed and passed through a second stage of combustion, preferably initiated by autoignition. The gases are then expanded with power output to rotor 82 and exhausted through port 88.

Engine Arrangements

There are numerous ways in which staged combustion concepts may be applied to multicylinder internal combustion engines. An example is a V–8 piston engine, the cylinder arrangement of which is shown in FIG. 3. In such engines, the crankshaft throws are normally related to obtain engine balance and allow for an equally spaced firing order of the cylinders of, for example, 1 – 8 – 4 – 3 – 6 – 5 – 7 – 2 in the FIG. 3 engine.

The initial tests of the staged combustion concept were conducted in a modified version of a conventional eight-cylinder engine in which the Number One cylinder was used as a first stage expansible chamber and was connected with the Number Seven cylinder, which acted as a second stage expansible chamber. With this arrangement, the intake stroke of the second stage cylinder was coextensive with the exhaust stroke of the first stage cylinder and the four-stroke cycle of the second stage cylinder followed that of the first stage cylinder by 540°, as in FIG. 1.

If desired, it would be possible to arrange a complete eight-cylinder engine with the above-mentioned conventional V-cylinder arrangement and firing order to have four second stage cylinders, each interconnected with and following one of four first stage cylinders by 540°. One of several possible arrangements, for example, would connect cylinder 1 with cylinder 7, cylinder 5 with cylinder 3, cylinder 8 with cylinder 2 and cylinder 6 with cylinder 4. Such an arrangement would provide the coextensive exhaust and intake strokes of the respective connected first and second stage cylinders characteristic of the originally tested arrangement. It would, however, also result in an engine firing order in which the firing of two first stage cylinders in sequence is followed by the firing of two second stage cylinders in sequence, etc. This would not be the best arrangement from the standpoint of avoiding engine torsional vibrations.

Figure 5:
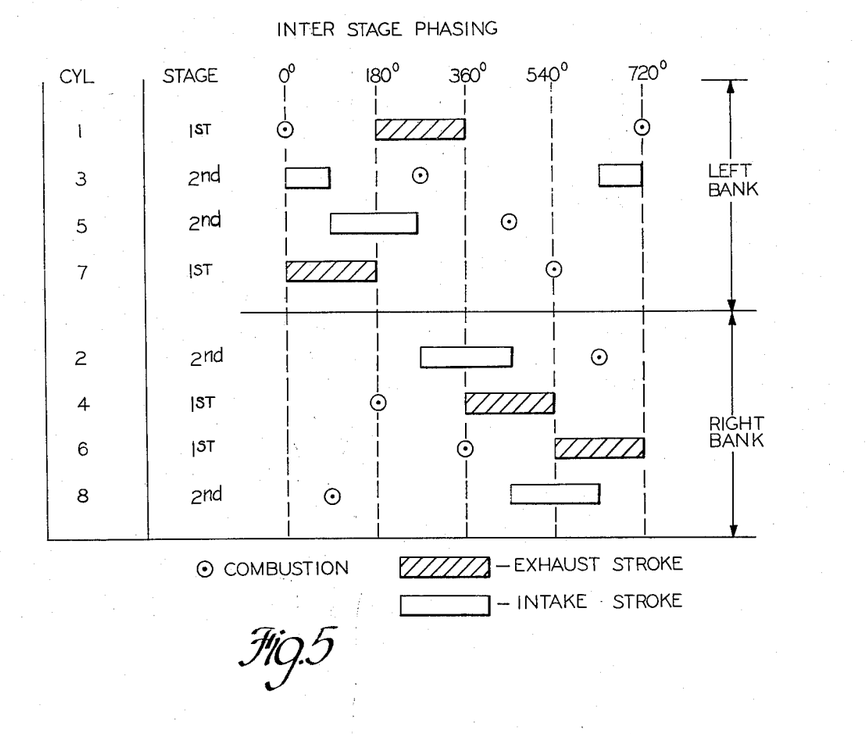
FIG. 5 is a diagram showing the interstage phasing and combustion timing of the engine of FIG. 3.

The arrangement of FIG. 3 has the advantage over the above-mentioned possibilities that first and second stage cylinders fire in alternate sequence, with firing of all cylinders being equally spaced in order to minimize torsional vibrations. While the connected first and second stage cylinders do not have coextensive exhaust and intake strokes, the arrangement is such that each first stage cylinder has the first half of its exhaust stroke coextensive with the last half of the intake stroke of a second stage cylinder with which it is connected by one of the common manifolds 63, 64. In this way the initial exhaust blowdown and a large portion of the gas transfer may be accomplished during common exhaust and intake processes with only a relatively smaller portion of the exhaust gases being temporarily stored in the manifolds until the beginning of a later second stage intake stroke. FIG. 5 shows the interstage phasing and combustion timing of the FIG. 3 arrangement.

In applying the staged combustion processes to a rotary engine, it is possible to connect two rotors in series so that the exhaust processes of the chambers defined by the first stage rotor are coextensive with the intake processes of the chambers defined by the second stage rotor. Alternatively, however, torsional vibrations may be reduced by arranging for equal firing intervals in the manner shown in FIG. 4, in which the two rotors are oppositely timed. The effect of this arrangement on the gas flow between chambers may be varied somewhat by selection of the port locations and timing.

Operational Variables

In order to operate the staged combustion processes with the desired efficiency, it is necessary that second stage combustion begin shortly before the end of the compression stroke, with combustion being completed as soon as possible after the beginning of the expansion stroke. A number of operating variables directly affect the timing of second stage combustion and, therefore, the operating efficiency. FIGS. 6 – 10 show the results of tests which indicate the importance of some of these variables.

It should be noted that in these tests, second stage inlet temperatures were measured at a point before the addition of secondary air to the interstage conduit. However, the addition of secondary air at about room temperature is believed to have had some effect on measured inlet temperatures, at least at the higher rates of secondary air flow.

Figure 6:
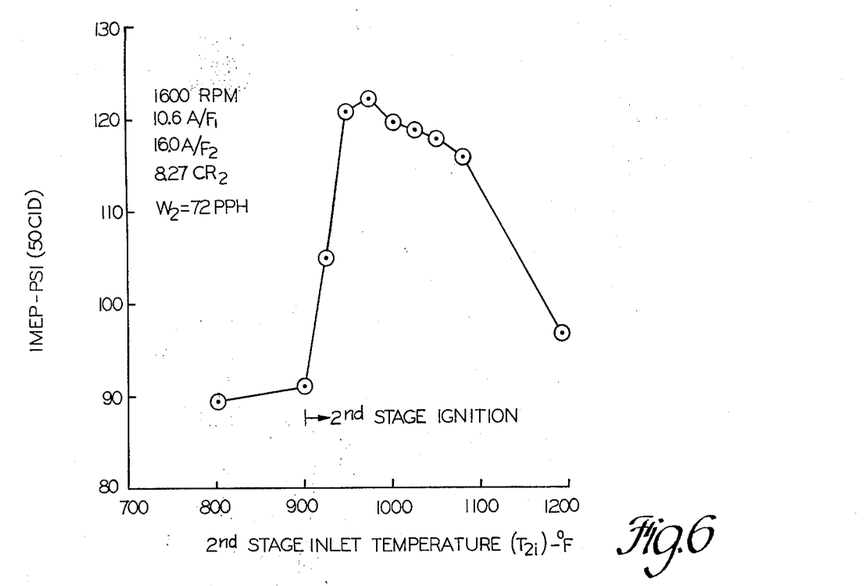
FIGS. 6 – 13 are graphs showing the relationships of certain variables of staged combustion engine operation determined or computed from the results of actual engine tests.

FIG. 6 shows the effect of second stage inlet temperature on the indicated mean effective pressure (IMEP) developed by a test engine with two 50 cubic inch displacement (CID) cylinders arranged in series for staged combustion operation. IMEP values are based on a single 50 CID cylinder. As shown in the figure, the other test conditions, which were held constant, included an engine speed of 1,600 rpm, second stage compression ratio ($CR_2$) of 8.27 to 1, second stage air flow ($W_2$) of 72 pounds per hour (PPH) and air-fuel ratios in the first stage ($A/F_1$) of 10.6 to 1 and in the second stage ($A/F_2$) of 16 to 1. The curve indicates that a second stage inlet temperature in excess of 900°F. was required under these conditions to initiate combustion. Peak power was realized with an inlet temperature of about 975° F. and power dropped off substantially at above about 1,075° F. due to early combustion in the second stage. This illustrates that for the particular operating conditions a second stage inlet temperature of 975° F. resulted in ignition and burning in the most efficient manner. Further, inlet temperatures within a range of from about 925° to about 1,125° F. yielded acceptable power and efficiency with IMEP values upwards of 110 psi.

Figure 7:
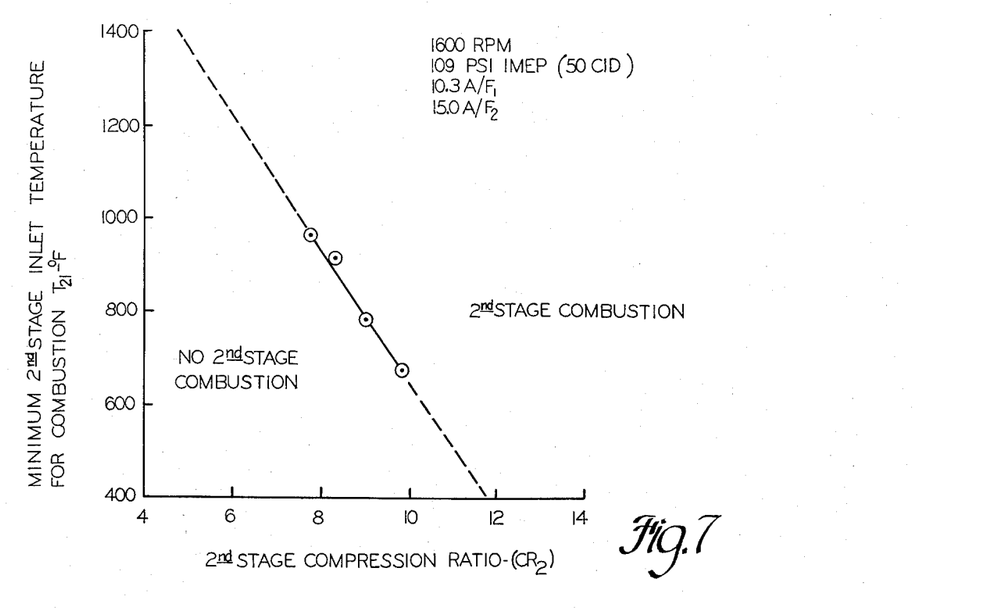

FIG. 7 shows the effects of second stage compression ratio on the minimum second stage inlet temperature ($T_{2i}$) required to initiate combustion under indicated operating conditions. The curve shows that an increase in the compression ratio of the second stage gives a substantial decrease in the inlet temperature required, the change approximating a temperature requirement reduction of 150° F. for each unit of increase in the compression ratio.

Figure 8:
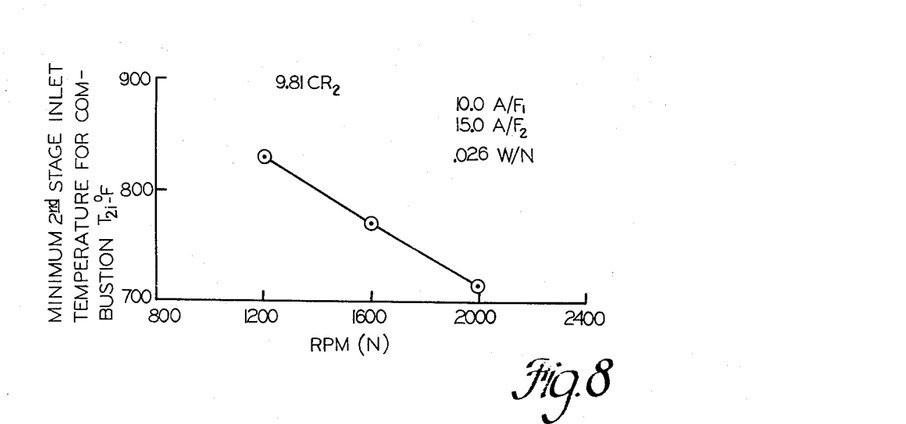

FIG. 8 illustrates the effect of variations in engine speed on the minimum second stage inlet temperature required for combustion. As the graph shows, speed changes in the range of from 1,200 to 2,000 rpm modify the required inlet temperature by a ratio of about a 15° F. reduction for each 100 rpm (50 cycles per minute) increase in speed. This result is believed attributable to the reduction in heat losses from each unit of charge that results from increased speeds.

Figure 9:
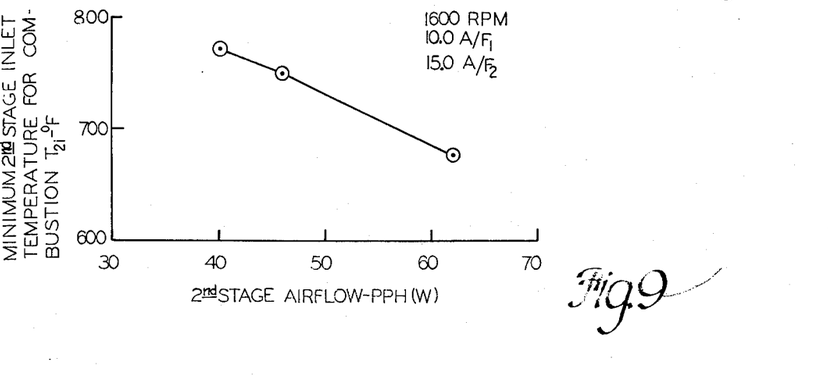

FIG. 9 shows the effects of variations in air flow through the second stage on the inlet temperature required for combustion therein. In the 50 CID cylinder tested, the results show a reduction of about 4° F. in required inlet temperature for each pound per hour increase in second stage air flow. Converting this to a figure useful in other engines, the ratio amounts to about a 2° F. decrease in second stage inlet temperature for each pound per hour increase in air flow per 100 cubic inches of displacement of the second stage cylinders. This result is also believed attributable to a reduction in heat loss from each unit of charge as the mass flow is increased.

Figure 10:
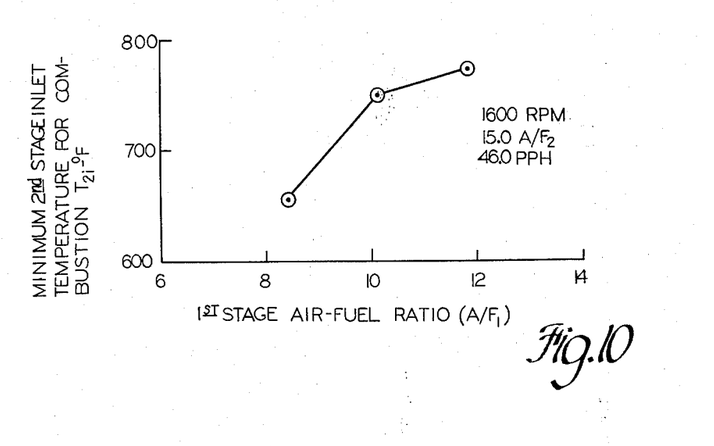

FIG. 10 graphs the effects of variations in the first stage air-fuel ratio ($A/F_1$) on the minimum second stage inlet temperature required for combustion. The curve is not a straight line function but shows an increase in inlet temperature required as the first stage air-fuel ratio is increased. The change is on the order of 50° F. for each unit change in ratio between 8 and 10 to 1 and on the order of 10° F. for each unit change in ratio between 10 and 12 to 1. This appears to indicate that as the amount of combustibles in the second stage charge are reduced a higher temperature must be reached in order to auto-ignite the charge.

Load Range and Control

Without some form of control, the load conditions under which staged combustion may take place are limited. Second stage inlet temperatures are primarily dependent upon first stage exhaust temperatures, unless some form of temperature modification, such as interstage cooling, is used. Thus, under increasing loads, increasing first stage exhaust temperatures will result in a condition where second stage output is limited by early combustion caused by excessive inlet temperatures unless a very low compression ratio is used. Also, for a given second stage compression ratio there is a minimum load at which staged combustion may take place without some form of interstage control or treatment. This results because, as load is reduced, the reduction in first stage exhaust temperature will at some point drop the second stage inlet temperature below that required for second stage combustion. Accordingly, either the inlet temperature must be raised or the compression ratio increased to obtain staged combustion at lower loads.

A number of methods are considered feasible for controlling the variables in order to provide a staged combustion engine with a reasonable operating load range. The concepts of interstage cooling and varying second stage compression ratio used either separately or in combination appear to be the most practical.

Figure 11:
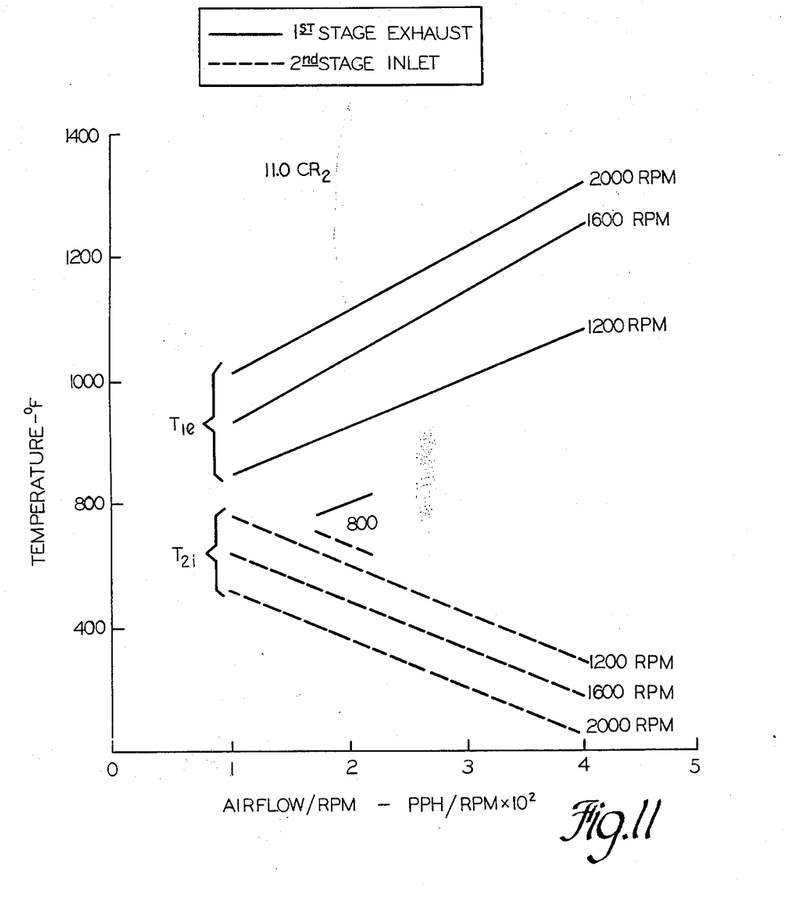
Figure 12:
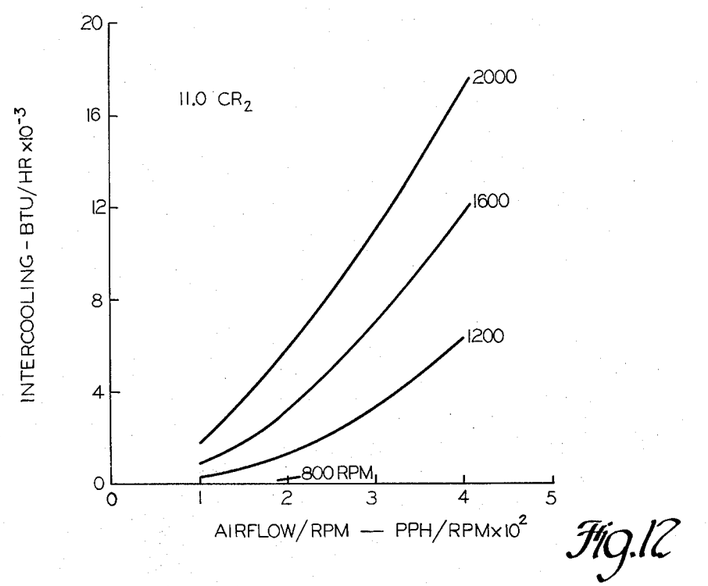

FIG. 11 illustrates the effects (as calculated from related test data) of engine speed and load (expressed as air flow/speed) on the first stage exhaust and second stage inlet temperatures of an engine operating at 11 to 1 compression ratio in the second stage. With this condition, the entire load range of the engine could be operated at a constant compression ratio with varying degrees of cooling being provided, ranging from a very small amount for low loads and speeds to a very substantial amount for high loads and speeds. FIG. 12 indicates the amount of intercooling which would be required under the various load and speed conditions of FIG. 11 based on a 50 CID per cylinder two-cylinder engine of the type tested operating with a second stage compression ratio of 11 to 1.

Figure 13:
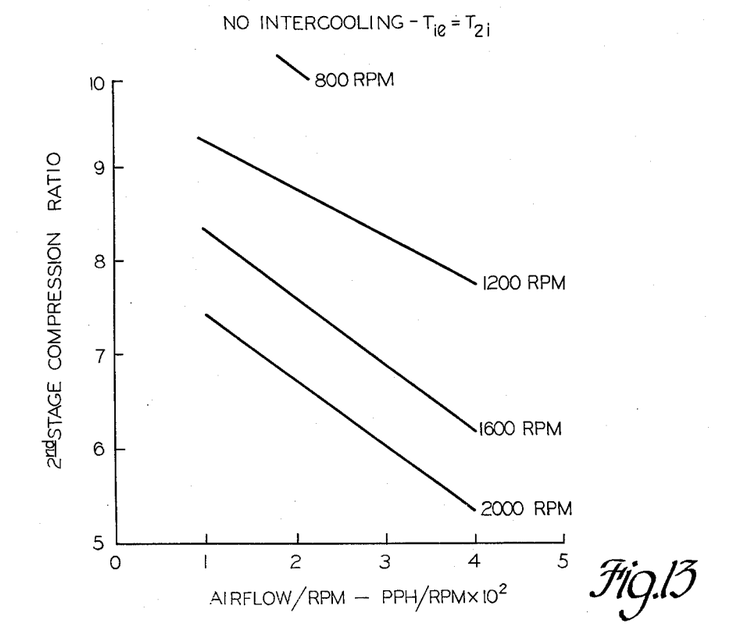

FIG. 13 (based on calculations from test data) illustrates the manner in which second stage combustion timing could be controlled by varying the second stage compression ratio without any intercooling between stages. With this arrangement, variation of compression ratios from 11 to 1 at very low loads down to nearly 5 to 1 at high loads would be capable of covering a reasonable range of engine load and speed conditions.

To further extend the range of engine operation or to provide practical control concepts capable of response speeds required for vehicle operation may make desirable some combination of control concepts such as matching variable second stage compression ratios with some degree of variable interstage cooling. If needed, other means of control, such as adding combustion accelerators or retardants to the interstage gases might also be used separately or in any desired combination.

As discussed above, the power output of the second stage varies in accordance with the temperature of the inlet gases. Below a minimum temperature, auto-ignition does not take place and there is no significant output. Further increases in minimum temperature result in increased output as the ideal timing is approached but still further increases cause reduced output as ignition begins to occur too early in the cycle. Above a still higher temperature, the effects of excessively early ignition curtail the power output to the point where no significant second stage output occurs.

For the conditions of the test of FIG. 6, the inlet temperature range (measured as the temperature of that portion of the gases obtained from the first stage) for effective second stage power output is about 925° F. to about 1125° F. based upon an engine power output of 110 IMEP or above. The test data illustrated by FIGS. 7 – 10 indicate that the minimum temperature varies in accordance with (a) second stage compression ratio (b) operating speed (c) second stage air flow rate, and (d) first stage air-fuel ratio. As a guide to the approximate range of effective inlet temperature range, the range of about 925° F. to about 1,125° F. should be modified as follows:

a. About 150° F. for each unit of change in the second stage compression ratio within the range of ratios of from 5:1 to 12:1 and in the mode opposite such change; that is, a decreased temperature with increased compression ratio;

b. About 15° F. for each 50 cycles per minute change in operating speed in the range of from 600 – 1,000 cycles per minute and in the mode opposite such change; that is, a decreased temperature with increased speed;

c. About 2° F. for each pound per hour change in second stage air flow per 100 cubic inches displacement of the second stage chambers and in the mode opposite such change; that is, a decreased temperature with increased air flow;

d. About 50° F. for each unit change in first stage air-fuel ratio in the range of ratios from 8:1 to 10:1 and, if the range of ratios is from 10:1 to 12:1, about a 10° F. change for each unit change in the first stage air-fuel ratio, in the same mode as the change; that is, increased temperature with increased air-fuel ratio.

The foregoing is a guide to the range of effective inlet temperature to the second stage. In any specific engine, it is necessary to select specific temperatures (or other operating conditions if the temperature be fixed) to provide effective power output from the second stage desired.

Exhaust Emissions

The engine of the present invention is characterized by combustion in the second stage largely of carbon monoxide and hydrogen. In this respect, the combustion differs from that of hydrocarbon fuel in the first stage. Tests show that the quench volume of the combustion chamber has a significant influence on carbon monoxide emissions. This volume includes the piston-cylinder crevice above the top compression ring and the volume between the top of the piston and the cylinder head when the separation is less than 0.1 inch with the piston at top dead center. Tests indicate that the carbon monoxide emissions are approximately proportional to the second stage quench volume. While such proportionality may not exist over the entire range of possible quench volumes, it is desirable to minimize such volume in the second stage.

As to the first stage, its quench volume does not critically affect engine emissions.

As to oxides of nitrogen, tests have indicated that very small percentages of $NO_x$ are present in the first stage. Further, tests have shown that exhaust gas recirculation to the first stage further decreases the $NO_x$ emissions. With respect to the second stage, it is recognized that making the first stage air-fuel ratio more lean reduces the second stage combustion temperature. This makes $NO_x$ formation in the second stage less likely and reduces overall engine $NO_x$ emissions.

Test measurements have been made using exhaust gas recirculation to the first stage, utilizing the exhaust products of the second stage or of the first stage before the addition of air. Such tests indicate that $NO_x$ production of the engine decreases with increased recirculation. The benefit is most pronounced when the amount of recirculation is less than about 20 percent by volume of the first stage air flow. At about 20 percent exhaust gas recirculation or more, the effect of the air-fuel ratio of the first stage was found to disappear. With lesser amounts of recirculation, an increase of first stage air-fuel ratio from 10.9 to 11.6 substantially increased the nitrogen oxides. In tests with a two-cylinder engine operating at 2,000 rpm, wide-open throttle, and some exhaust gas recirculation to the first stage, together with cooling of the interstage gases in the amount required to provide maximum fuel economy, the following conditions were observed:

| | |
|---|---|
| 1. Exhaust gas recirculation, first stage | 17.4% |
| 2. Indicated horsepower | 19.9 hp |
| 3. Indicated mean effective pressure | 157 psi |
| 4. Indicated specific fuel consumption | .344 pounds per horsepower hour |
| Exhaust Emissions | |
| 5. Hydrocarbons* | 23 ppm |
| 6. Carbon Monoxide* | 0.23% |
| 7. Nitrogen Oxides* | 54 ppm |
| *Corrected as in Table A | |

Power and Fuel Economy

It is believed that a 400 cubic inch displacement engine constructed in the arrangement of FIG. 3 and using the staged combustion of the present invention would produce approximately equivalent maximum power to a 280 cubic inch displacement conventional engine. As compared with a conventional engine operating at a 10 to 1 air-fuel ratio, such as might be used to reduce nitrogen oxides, the staged combustion engine is estimated to have about 30 percent lower indicated specific fuel consumption, about 23 percent lower brake specific fuel consumption and to be capable of obtaining about 23 percent greater miles per gallon in equivalent vehicle operations.

Reference is made herein to the overall engine air-fuel ratio. By this is meant the relationship of the total air to the engine (first stage air plus air admitted between the stages) to the fuel admitted to the first stage.

It should be apparent that the various modifications of the operating method described may be adapted through suitable modifications or additions to any of the various engine arrangements described herein.

While the invention has been described by reference to certain illustrative embodiments, it should be understood that numerous changes could be made within the scope of the inventive concepts disclosed. Accordingly, it is intended that the invention not be limited by the disclosure but that it have the full scope permitted by the language of the following claims.

I claim:

1. The method of operating an internal combustion engine of the type having expansible chambers in which a compressed change is burned and expanded to supply net energy per cycle to a rotating shaft, the method comprising the steps of:
    a. successively compressing, burning and expanding a mixture composed primarily of air and hydrocarbon fuel in combustion supporting proportions but sufficiently rich in fuel to produce combustion produts having low residuals of nitrogen oxides and high residuals of incompletely burned fuel combustibles primarily in the form of CO and $H_2$, while delivering primary energy to the rotating shaft;
    b. adding air to said combustion products in amount sufficient to form a new mixture having (1) an overall engine air-fuel ratio slightly lean in fuel, (2) available total energy substantially less than that of the hydrocarbon fuel originally supplied, and (3) a capability of compression ignition, and burnable to minimize residuals of combustibles while maintaining low residuals of nitrogen oxides;
    c. compressing said last mixture sufficiently to initiate combustion;
    d. varying at least one of the engine operating conditions consisting of (1) the temperature of the combustion products utilized to form said last mixture in step (b) and (2) the ratio of compression in step (c), as required to obtain self-ignition of said last mixture near the end of the compression step (c); and
    e. burning said last mixture without substantial additional compression and expanding the burned mixture to deliver secondary energy to the rotating shaft and to yield discharge gases with minimum residuals of combustibles and nitrogen oxides.

2. The method of operating an internal combustion engine of the type having expansible chambers in which a compressed charge is burned and expanded to supply net energy per cycle to a rotating shaft, the method comprising the steps of:
 a. successively compressing, burning and expanding a mixture composed primarily of (1) air and hydrocarbon fuel in combustion supporting proportions but substantially richer in fuel than a stoichiometric mixture, and (2) recirculuated combustion products, to produce combustion products having low residuals of nitrogen oxide and high residuals of incompletely burned fuel combustibles substantially in the form of H₂ and CO, while delivering primary energy to the rotating shaft;
 b. adding air to said combustion products in amount sufficient to form a new mixture having (1) an overall engine air-fuel ratio slightly lean in fuel, (2) available total energy substantially less than that of the hydrocarbon fuel originally supplied, and (3) a capability of compression ignition, and burnable to minimize residuals of combustibles while maintaining low residuals of nitrogen oxides; c. compressing said last mixture sufficient to initiate combustion;
 d. varying at least one of the engine operating conditions consisting of (1) the temperature of the combustion products utilized to form said last mixture in step (b) and (2) the ratio of compression in step (c), as required to obtain self-ignition of said last mixture near the end of the compression step (c); and
 e. burning said least mixture without substantial additional compression and expanding the burned mixture to deliver secondary energy to the rotating shaft and to yield combustion products with minimum residuals of combustibles and nitrogen oxides; said recirculated combustion products being from one of said expansion steps.

3. The method of operating an internal combustion engine of the type having at least two expansible chambers that execute successive expanding and contracting strokes and each supplies net energy per cycle to a rotating shaft, the method comprising the steps of:
 a. successively supplying to one of said chambers a mixture composed primarily of air and hydrocarbon fuel in combustion supporting proportions with an excess of fuel over stoichiometric so as to produce, upon combustion, gases having low residuals of nitrogen oxides and high residuals of combustibles primarily in the form of H₂ and CO;
 b. successively compressing, burning, and expanding said mixtures in said one chamber to deliver primary energy to the rotating shaft to produce interstage gases having substantial amounts of incompletely burned fuel but low in nitrogenn oxides;
 c. successively delivering said interstage gases to the other of said chambers, together with air in amount sufficient to provide mixtures having (1) overall engine air-fuel ratios leaner than stoichiometric, (2) available total energy substantially less than that of the hydrocarbon fuel originally supplied, and (3) a capability of compression ignition;
 d. compressing said successive last mixtures in said other chamber sufficiently to initiate combustion, the ratio of such compression being variable to asssure self-ignition of said last mixtures near the end of the second compression step (d); and
 e. successively burning and expanding the mixtures in the last mentioned chamber without substantial additional compression to deliver secondary energy to the rotating shaft while producing exhaust gases having low residuals of both nitrogen oxides and combustibles.

4. The method of operating an internal combustion engine of the type having at least two expansible chambers that execute successive expanding and contracting strokes and each supplies net energy per cycle to a rotating shaft, the method comprising the steps of:
 a. successively supplying to one of said chambers a mixture composed primarily of air and hydrocarbon fuel in combustion supporting proportions with an excess of fuel over stoichiometric so as to produce, upon combustion, gases having low residuals of nitrogen oxides and high residuals of combustibles primarily in the form of H₂ and CO;
 b. successively compressing, burning, and expanding said mixtures in said one chamber to deliver primary energy to the rotating shaft and to produce interstage gases having substantial amounts of incompletely burned fuel but low in nitrogen oxides;
 c. varying the temperature of the interstage gases to control said temperature within a desired range, selected to assure self-ignition of the subsequently formed mixtures near the end of the second compression step (d);
 d. successively deliverying said temperature controlled interstage gases to the other of said chambers, together with air in amount sufficient to provide mixtures having (1) overall engine air-fuel ratios leaner than stoichiometric, (2) available total energy substantially less than that of the hydrocarbon fuel originally supplied, and (3) a capability of compression ignition when compressed in a predetermined compression ratio;
 e. compressing said successive last mixture in said predetermined ratio in said other chamber so as to cause self-ignition of said mixtures near the end of such compression step; and
 f. successively burning and expanding the mixtures in the last mentioned chamber without substantial additional compression to deliver secondary energy to the rotating shaft while producing exhaust gases having low residuals of both nitrogen oxides and combustibles.

5. The method of operating an internal combustion engine of the type having at least two expansible chambers that execute successive expanding and contracting strokes and each supplies net energy per cycle to a rotating shaft, the method comprising the steps of:
 a. successively supplying to one of said chambers a mixture composed primarily of air and hydrocarbon fuel in combustion supporting proportions with an excess of fuel over stoichiometric so as to produce, upon combustion, gases having low residuals of nitrogen oxides and high residuals of combustibles primarily in the form of H₂ and CO;
 b. successively compressing, burning, and expanding said mixtures in said one chamber to deliver primary energy to the rotating shaft and to produce interstage gases having substantial amounts of incompletely burned fuel but low in nitrogen oxides;
 c. Controlling the temperatures of the interstage gases before the addition of air thereto within the temperature range from about 925° F to 1,125° F when the engine is operating at a speed of about 800 cycles of each chamber per minute and at a load of about 144 pounds per hour of air flow for each 100 cubic inches of displacement of the second stage engine chambers with a second stage compression ratio of about 8.25 to 1, a first stage air-fuel ratio of about 10.5 to 1 and an overall air-fuel ratio of about 16 to 1 and varying said temperature range for other operating conditions as follows:
  1. about 150°F for each unit of change in the second stage compression ratio within the range of ratios of from 5:1 to 12:1 and in the mode opposite such change;
  2. about 15° F for each 50 cycles per minute change in operating speed in the range of from 600 — 1,000 cycles per minute and in the mode opposite such change;
  3. about 2° F for each pound per hour change in second stage air flow per 100 cubic inches displacement of the second stage chambers and in the mode opposite such change;
  4. about 50° F for each unit change in first stage air-fuel ratio in the range of ratios from 8:1 to 10:1 and a change of about 10°F for each unit change in first stage air-fuel ratio in the range of ratios from 10:1 to 12:1 and in the same mode as such change in each instance;
d. successively delivering said interstage gases to the other of said chambers, together with air in amount sufficient to provide mixtures having (1) overall engine air-fuel ratios leaner than stoichiometric, (2) available total energy substantially less than that of the hydrocarbon fuel originally supplied, and (3) a capability of compression ignition;
e. compressing said successive last mixtures in said other chamber sufficiently to initiate combustion; and
f. successively burning and expanding the mixtures in the last mentioned chamber without substantial additional compression to deliver secondary energy to the rotating shaft while producing exhaust gases having low residuals of both nitrogen oxides and combustibles.
d. varying at least one of the engine operating conditions consisting of (1) the temperature of the combustion products utilized to form said last mixture in step (b) and (2) the ratio of compression in step (c), as required to obtain self-ignition of said last mixture near the end of the compression step (c); and 6. An internal combustion engine comprising, in combination;
a pair of banks each having four aligned cylinders, pistons reciprocable within said cylinders, respectively, a crankshaft, and connecting rods connecting the pistons of each bank, respectively, to the crankshaft, the two inboard cylinders of one bank together with the two outboard cylinders of the opposite bank comprising first stage cylinders and the two inboard cylinders of said opposite bank together with the two outboard cylinders of said one bank comprising second stage cylinders, said cylinders being subject to operating cycles including intake, compression, expansion and exhaust events produced by corresponding strokes of their respective pistons, the cycles of all said cylinders being equally spaced and the first stage cylinders and the second stage cylinders having alternate expansion events, said cylinder cycles being phased such that the exhaust event of each first stage cylinder occurs, at least in part, during the intake event of a second stage cylinder in the same bank;
an intake manifold and fuel supply system effective to supply said first stage cylinders with a fuel-rich air-fuel mixture capable of producing upon combustion, discharge gases having substantial amounts of incompletely burned fuel residuals and minimal quantities of nitrogen oxides;
spark ignition means for said first stage cylinders;
an interstage manifold for each bank and interconnecting the first and second stage cylinders of their respective banks, said interstage manifolds being connected to receive discharge gases exhausted from their respective first stage cylinders and to supply said gases to their respective second stage cylinders;
a. successively supplying to one of said chambers a mixture composed primarily of air and hydrocarbon fuel in combustion supporting proportions with an excess of fuel over stoichiometric so as to produce, upon combustion, gases having low residuals of nitrogen oxides and high residuals of combustibles primarily in the form of $H_2$ and CO;
means to supply air to said interstage manifolds, respectively, in quantities sufficient to provide overall engine operation leaner than stoichiometric;
exhaust conduits for second stage cylinders of each bank; and
means to control the admission and discharge of gases from the cylinders, respectively.

* * * * *

UNITED STATES PATENT AND TRADEMARK OFFICE
CERTIFICATE OF CORRECTION

PATENT NO. : 3,924,576
DATED : December 9, 1975
INVENTOR(S) : Robert M. Siewert

It is certified that error appears in the above-identified patent and that said Letters Patent are hereby corrected as shown below:

Column 4, line 52, "ratio" should read --ratio)--.

Column 13, line 22, "sufficient" should read --sufficiently--.

line 30, "least" should read --last--.

line 51, "shaft to" should read --shaft and to--.

line 53, "nitrogenn" should read --nitrogen--.

Column 15, lines 43-49, beginning "d. varying at least one" and ending "compression step (c); and", should be deleted.

Column 16, lines 36-42, beginning "a. successively supplying to one" and ending "form of H₂ and CO;" should be deleted.

Signed and Sealed this

Sixth Day of July 1976

[SEAL]

Attest:

RUTH C. MASON
*Attesting Officer*

C. MARSHALL DANN
*Commissioner of Patents and Trademarks*